United States Patent [19]

Mathis

[11] Patent Number: 4,846,676
[45] Date of Patent: Jul. 11, 1989

[54] OSCILLATING DISCHARGE CHUTE

[75] Inventor: Oscar Mathis, Cary, Ill.

[73] Assignee: General Kinematics Corporation, Barrington, Ill.

[21] Appl. No.: 32,866

[22] Filed: Mar. 31, 1987

[51] Int. Cl.[4] ............... F27D 15/02; B65G 47/20
[52] U.S. Cl. ........................... 432/77; 432/83; 198/535; 198/631; 198/952
[58] Field of Search ............... 198/360, 535, 631, 952; 110/165 R; 432/77, 78, 81, 84, 85, 83

[56] References Cited

U.S. PATENT DOCUMENTS

| | | | |
|---|---|---|---|
| T927,006 | 10/1974 | Goverts | 198/631 X |
| 1,996,535 | 4/1935 | Beck | 198/535 |
| 2,538,556 | 1/1951 | Coridlis et al. | 198/631 X |
| 2,815,135 | 12/1957 | Küllmar | 198/771 X |
| 2,905,311 | 9/1959 | Marchetti | 198/631 |
| 3,232,416 | 2/1966 | Winter | 198/535 |
| 3,822,007 | 7/1974 | Bridge, Jr. | 198/631 |
| 3,837,510 | 9/1974 | McWilliams | 198/535 X |
| 3,857,344 | 12/1974 | Coulter | 110/165 R |
| 4,094,399 | 6/1978 | George | 198/631 X |
| 4,109,590 | 8/1978 | Mansfield | 110/165 R X |
| 4,171,948 | 10/1979 | Kraus et al. | 432/85 |
| 4,384,535 | 5/1983 | McKelvie | 110/165 R |
| 4,395,176 | 7/1983 | Green | 198/631 X |
| 4,443,955 | 4/1984 | Beckman | 432/85 X |
| 4,616,745 | 10/1986 | Hartness | 198/442 |

Primary Examiner—Robert J. Spar
Assistant Examiner—D. Glenn Dayoan
Attorney, Agent, or Firm—Wood, Dalton, Phillips, Mason & Rowe

[57] ABSTRACT

The invention relates to a structure for controllably discharging articles that are being continuously transported by a primary conveying structure. A discharge assembly is provided having a chute with an inlet and an outlet. Articles are diverted away from the primary conveying structure and delivered to the chute inlet. The discharge chute is mounted for rotation about a vertical axis and structure is provided for reciprocatively moving the chute outlet back and forth over an infeed portion of a secondary conveying structure to evenly distribute material in a serpentine path along the length of the infeed portion of the secondary conveying structure. In a preferred form, the secondary conveying structure has an associated trough for containing a cooling fluid.

12 Claims, 3 Drawing Sheets

OSCILLATING DISCHARGE CHUTE

BACKGROUND OF THE INVENTION

1. Field of the Invention

This invention relates to structure for diverting articles out of a continuous conveying path and, more particularly, to a structure for controllably discharging diverted articles to prevent localized accumulation.

2. Background Art

In conventional glass molding operations, molten glass at approximately 2300–2600 F. is conveyed continuously in discrete volumes called gobs to mold cavities at a molding station. The size of the gob is dictated by the size of the part, such as a bottle or the like, that is being formed on a particular run.

Typically, a continuous stream of molten glass flows from a furnace and is separated or cut into the gobs, which are conveyed continuously to the molds. As a general rule, once the furnace is tapped and molten glass flow starts, conveying of gobs from the furnace is carried out continuously, through a campaign, which may last from 3–5 years.

In the event that a mechanical problem is encountered at the molding station downstream of the furnace or in the event that a mold change is required, it may be necessary to interrupt the molding operation. However, the conveying of the gobs will nonetheless proceed and provision must be made to divert the gobs from their normal route taken to the molding station. Handling the diverted gobs has posed a serious problem to the industry. The high temperature gobs must be accumulated in a form that facilitates recycling and cooled without endangering workmen operating the system.

Heretofore, two types of structure have been used to accommodate the diverted gobs. One of these is called a tap box. A tap box is essentially a steel container with drilled holes to allow the escape of a cooling fluid which is used to quench the gobs collected in the container. However, the industry is moving away from tap boxes principally because they require the supervision of several workmen to keep up with glass flow and are extremely dangerous to work around. The high temperature gobs, when quenched, may tend to explode into shattered particles generally the size of pea gravel and pose a serious health hazard to those in the vicinity of the tap box. Additionally, the glass gobs accumulate to form a solid mass which is difficult to handle and recycle.

As an alternative to the tap box, water filled, vibratory conveyors have been used to intercept, cool and accumulate the diverted gobs. An apparatus suitable for use in a glass molding system is shown in U.S. Pat. No. 4,171,948, to Kraus et al. In Kraus et al a trough contains a predetermined level of cooling fluid and is vibrated to continuously convey material through the fluid between an entry and an outlet end, with the latter residing above the level of the cooling fluid. The gobs entering the fluid explode due to thermal shock upon encountering the fluid.

One problem with conventional systems, such as that in Kraus et al, is that the chute which directs the gobs onto the conveyor is fixed so that the gobs are directed onto a single location on the conveying trough. With a steady flow of gobs, such a system is highly acceptable. However, during an upset period, wherein all gobs are diverted out of the main stream, maximum reject rate occurs and several problems may develop.

First, the chutes and conveyor may experience a substantial temperature elevation. The gobs contacting the heated chute remain partially melted and may adhere thereto. Rapid buildup as far back as the molding station may occur and with the resulting heat concentration a fire may erupt and/or dangerous overflow of molten glass may occur.

Another problem is that as the temperature of the bath increases, the gobs will not effectively explode and distribute themselves in the trough, which action is normally relied upon by systems designers, resulting in a buildup at the entry portion of the conveying trough. At high flow rates, this condition can deteriorate to the point that some of the gobs may not be immersed and may move off of the trough end in clumps at dangerously high temperatures. Again, a serious threat to the health of workmen is apparent.

Still further, the unexploded gobs do not convey at the same rate through the fluid as the shattered glass particles. This may result in a backup as far as the chute, with the consequences apparent.

SUMMARY OF THE INVENTION

The present invention is specifically directed to overcoming the above enumerated problems in a novel and simple manner.

It is a principal objective of the present invention to provide structure for diverting heated articles, that are continuously conveyed away from a primary conveying direction, and for evenly distributing the diverted articles in a quenching conveying trough. Localized accumulation in the trough is prevented and the articles become totally immersed in the fluid even at high discharge rates so that predictable cooling occurs.

To accomplish this, the discharge assembly has a chute with an inlet and an outlet, that is mounted on an upright post for rotation about a vertical axis. The chute inlet is situated to direct diverted articles onto the quenching conveying trough which moves articles in a first direction, as by vibratory action. Structure is provided for reciprocatively moving the discharge chute about its rotational axis so that the chute outlet traces a path that is generally transverse to the first direction of conveyance by the trough. Accordingly, the chute distributes articles back and forth across the width of the trough transverse to the first direction simultaneously as the trough vibrating structure is operated to move the articles away from the chute, to thereby prevent localized accumulation of articles.

Because the articles are distributed across the width of the infeed portion of the trough, the conveying speed of the trough can be reduced and the trough will still accommodate articles even at maximum reject rate. At a slower conveying speed, the shattered glass particles remain immersed for a longer time in the cooling fluid for a given trough length and thereby the glass particles become thoroughly cooled. Operating the vibration imparting structure at lower frequencies and amplitudes also prolongs the life of the equipment.

By reason of the distribution of articles in a serpentine path along the length of the conveyor, the aforementioned sticking and backup problems are obviated. In the case of glass gobs, the total immersion thereof accounts for effective shattering of the gobs. The discharging glass particles are thus predictably small in size and at a workable temperature.

Further, the system is precisely controllable by coordinating the speed of reciprocation and the conveying speed for the trough.

Another aspect of the invention is the provision of cooling structure for the discharge assembly. A cooling jacket is provided to confine a fluid which flows in heat exchange relationship in a prescribed path over both the outside and inside surfaces of the chute. The fluid maintains the chute at a sufficiently low temperature that the gobs will not adhere as they contact the guiding chute surface.

Structure is also provided for rotating the discharge chute to a bypass position, which is outside of the range of reciprocation for the chute. This permits the collection of articles at a location away from the secondary conveying structure.

BRIEF DESCRIPTION OF THE DRAWINGS

FIG. 4 is an enlarged, fragmentary, cross-sectional view of a liquid cooling system for a discharge chute in the 25 system in FIGS. 1-3.

DETAILED DESCRIPTION OF THE DRAWINGS

Figure 1:
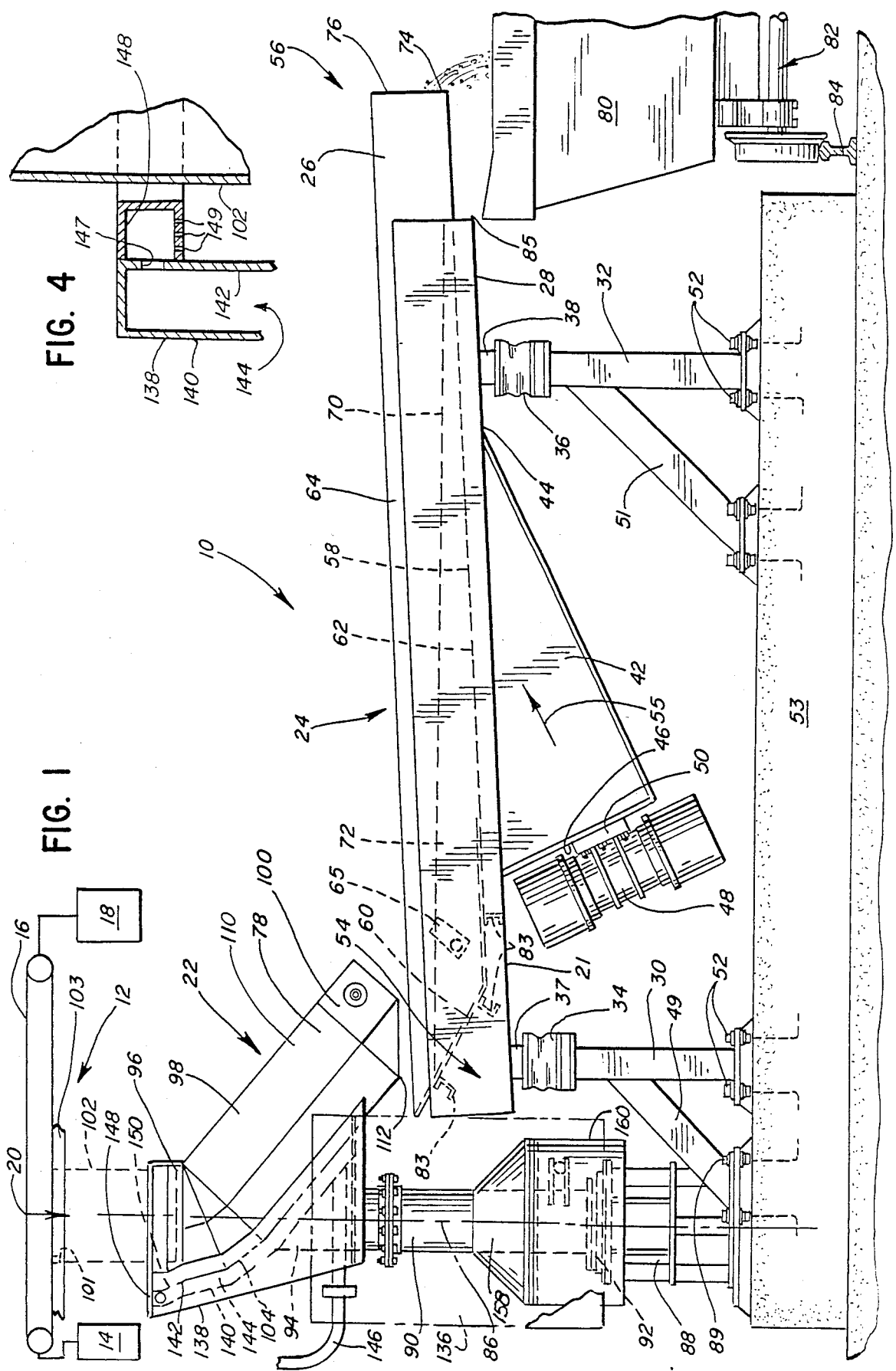
FIG. 1 is a side elevation of a discharge system incorporating the present invention.
Figure 2:
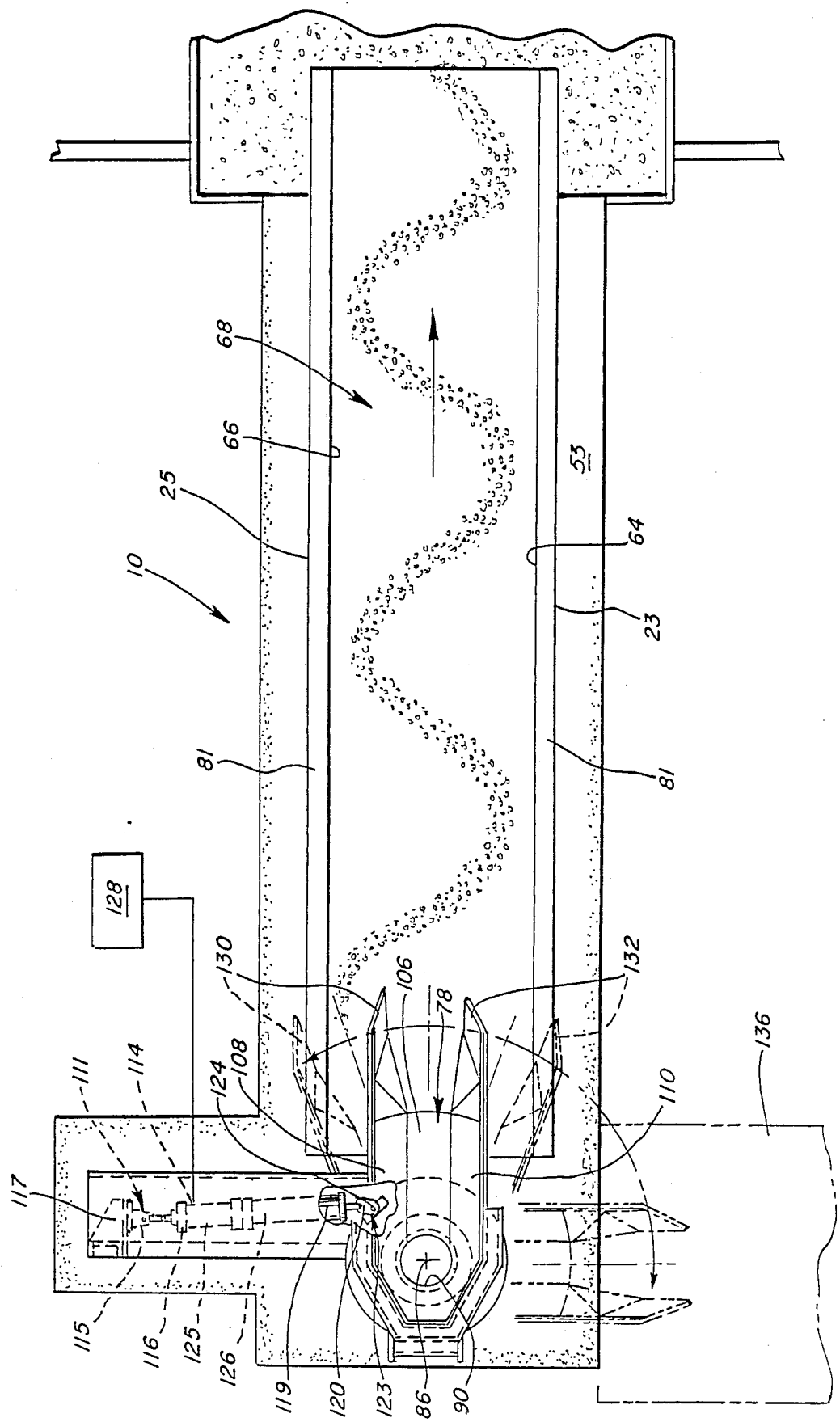
FIG. 2 is a plan view of the system in FIG. 1.
Figure 3:
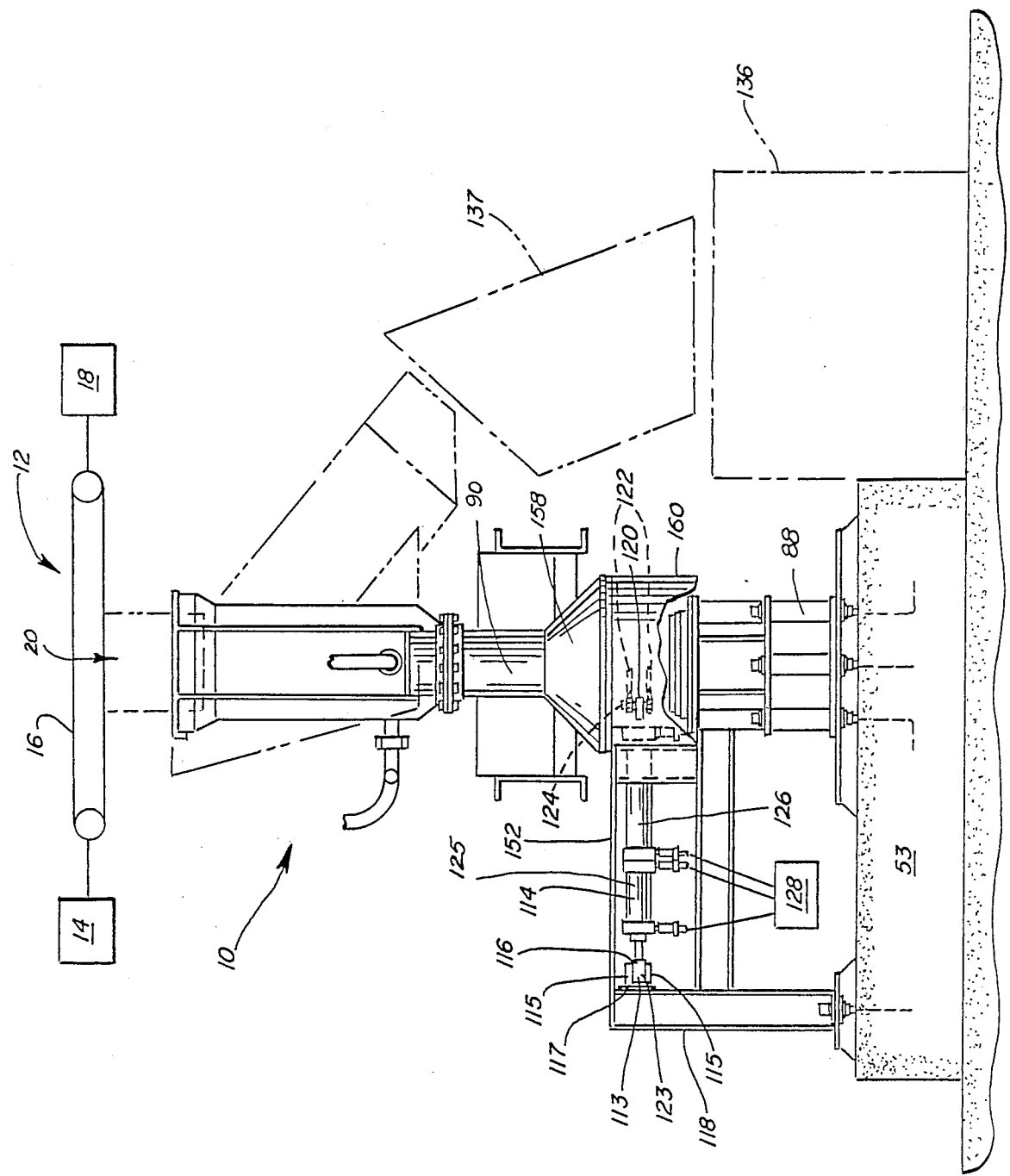
FIG. 3 is an end elevation view of the system in FIG. 1.

A discharge system according to the present invention is shown at 10 in FIGS. 1-3, for use in conjunction with a glass molding operation, depicted schematically at 12 above the apparatus of the present invention in FIGS. 1 and 3. It should be understood that the present invention has application in other environments and, particularly, ones wherein articles at elevated temperatures are to be continuously and controllably discharged.

Briefly, the glass molding operation 12 comprises a furnace 14, wherein glass is heated to a molten state at approximately 2300°-2600° F. A steady stream of molten glass from the furnace is cut into gobs, which gobs are transported in molten state by a conveyor 16 to a molding station 18, whereat bottles and the like are formed from the glass gobs and cooled.

A campaign constitutes a continuous run for the furnace and may last as long as from 3-5 years. If the molding station 18 requires maintenance or product die change or, if for any other reason operation of the molding station is interrupted, provision must be made to divert the molten gobs being transported by the conveyor 16 away from the molding station 18 and to collect, cool and prepare the gobs for recycling. It is for this purpose that the discharge system 10 according to the present invention is incorporated. A point of diversion 20 for the gobs is indicated schematically on the conveyor 16 between the furnace and the molding station 18.

The discharge system 10 according to the invention comprises generally a discharge assembly at 22 and a quenching conveying structure at 24. The conveying structure 24 has an upwardly opening fluid retaining trough 26 that is carried within a base 28. The bottom wall 21 of the base 28 is borne by upstream and downstream support leg pairs 30, 32 respectively. Each leg of the leg pairs 30, 32 has an associated resilient isolation member 34, 36 interposed between its upper end and blocks 37, 38, depending from the base 28. The base 28 has a platform 42 rigidly attached to its underside surface 44 with an associated wall surface 46 to which a pair of vibration imparting motors 48 (one shown) are mounted through a base 50. The leg pairs 30, 32 are secured through anchors 52 to a rigid concrete support block 53 for the system 10 and are reinforced through angled braces 49, 51. The motor 48 is of a conventional type construction and has one or more eccentric weights mounted on a shaft so that upon rotation of the shaft, a vibratory conveying force is imparted in the direction of arrow 55 tending to move material from an infeed end 54 of the conveyor structure 24 towards an outlet end 56.

The trough 26 is defined by a bottom, material-carrying wall 58 having an inlet feed surface 60 that declines towards the outlet end 56 and a conveying surface 62 that is inclined between the inlet end 54 and the outlet end 56 of the conveying structure 24. The trough has upstanding, spaced side walls 64, 66 which, in conjunction with the material conveying wall 58, define a fluid retention reservoir at 68. The amount of cooling fluid in the trough is chosen so that the upper level 70 of the fluid supply 72 is at or beneath the free edge 74 at the open, discharge end 76 of the trough 26. Cooling fluid is added to and, in some instances, removed from the trough through appropriate flow inlets and outlets 65. Material introduced to the trough 26 through a discharge chute 78, associated with the discharge assembly 22, is directed into the cooling fluid immediately above the inlet feed surface 60. The material discharged through the chute 78 is moved by gravitational forces down the surface 60 and by vibratory forces from left to right in FIG. 1 along the surface 58. Eventually, the material is caused to move over the free edge 74 of the trough and is collected by a container 80 which, in FIG. 1, is fit with a wheel assembly 82 for guiding movement of the container along a rail 84 transverse to the conveying direction for the conveying structure 24.

The trough 26 is narrower than the base 28 and is mounted in centered relationship between the base walls 23, 25 so that a space 81 is maintained between the trough side walls 64, 66 and base side walls 23, 25. The trough is supported from the base by three channel members 83, which are attached to the material carrying wall 58 on the trough, span the distance between the base walls 23, 25 and are rigidly attached to the base walls 23, 25 so that the trough wall 58 is spaced slightly above the bottom wall 21 of the base 28. The trough is thus supported in cantilever fashion by the channels 83 within the base 28. The base serves as a backup to accumulate and convey articles that escape over the side walls 64, 66 of the trough. Material collected by the base 28 is conveyed over the downstream edge 85 thereof and into the container 80 for collection.

Briefly, in the case of molten glass gobs, the thermal shock upon the gobs encountering the cooling fluid causes them to shatter and/or explode. As this occurs, the shattered glass particles under the explosive force tend to distribute themselves between the sidewalls of the trough. However, at a high flow rate, if the chute 78 is maintained in a stationary position, there is a tendency of the glass gobs to accumulate at the point of entry above the inlet feed surface 60. This results in a localized accumulation of gobs which elevates the temperature of the cooling fluid and leads to incomplete cooling of the gobs and potentially a gob buildup that may cause the gobs to back up in the chute 78 and possibly occasion a fire.

To prevent undesired, localized accumulation of gobs according to the present invention, structure is provided to reciprocatively rotate the chute 78 about a vertical axis 86. The discharge assembly 22 comprises an upright column 88 which is secured as by bolts 89 to the base 53. The column 88 supports an upright post 90 for rotation. A thrust bearing assembly 92 is interposed between the post 90 and column 88 to support and guide rotative movement of the post 90. The chute 78 is attached to the upper region 94 of the post 90.

The chute 78 has an inlet portion 96, a main conveying section 98 having a generally U-shaped cross section and a bifurcated outlet end 100. A feed conduit 102 is mounted at the point of diversion 20 of discharge system 10 and feeds material into the inlet portion 96. Typically the conduit 102 will be mounted in an opening 101 in a floor 103 that supports the molding system 12. Gobs passing downwardly through the conduit 102 first encounter a curved inside wall surface 104 of the chute 78, which deflects the gob flow towards the horizontal and into the main conveying section 98 wherein the particles are confined and guided by bottom wall surface 106 and spaced guide wall surfaces 108, 110. Material from the chute 78 moves past the free edge 112 of the bottom wall 106 and is deposited in the cooling liquid generally above the inclined inlet surface 60. The side guide wall surfaces 108, 110 extend beyond the free edge 112 and serve to confine discharging material within the side walls 64, 66 of the trough 26.

According to the invention, a tandem cylinder 114 is provided and has a stationary fitting or tab 113 on one end 116 mounted for a pivotal connection 111 between spaced ears 115 on a bracket 117 that is rigidly attached to an upright support 118 on the base 53. As shown in FIG. 2, a portion of the chute 78 is broken away to show the pivotal connection 123 between the other cylinder end 119 and the post 90 supporting the chute 78. The other cylinder end 119 has an associated fitting 120 located between spaced ears 122 on the post 90. A pin 124 extends through the ears 120 and the tab 120 to make a pivot connection at the end 119 of the cylinder 116. The axis of pin 124 is offset from the axis 86 about which the post 90 pivots. The fitting or tab 120 has an aperture for receipt of the pin 124 which aperture is offset from the longitudinal axis of the cylinder 114 for a purpose to be described hereinafter.

The cylinder 114 is preferably a pneumatic-type cylinder that is operated through a control 128 and has a first section 125 that is extensible relative to the connection 111 of the stationary fitting or tab 113 on the cylinder end 116 and a second section 126 that has the pivotal connection 123 that can be extended and retracted relative to both the first section 125 and the fitting 113. Through the control 128, section 125 is caused to be automatically alternatingly extended and retracted relative to section 126. Because the tabs 120 mounting the end 119 of the cylinder are offset from the axis 86 for the post 90, extension and retraction of the section 125 causes a reciprocating rotative motion to be imparted to the post 90 and associated chute 78 about axis 86. More specifically, retraction of the section 125 causes the chute 22 to be moved in a counterclockwise rotation from the normal, solid line position in FIG. 2 to the uppermost phantom position shown. Extension of the section 125 causes the chute 78 to move clockwise from the solid line position in FIG. 2 to the second or lowermost phantom position shown. The range of reciprocative rotation is chosen so that the discharging material will remain within the confines of the side walls 64, 66 of the trough 26 at both extremes of reciprocative movement.

Because pneumatic controls are used, no electrical power is required. This is preferred because glass quenching apparatus generally develop a substantial amount of moisture in the surrounding environment. Moisture poses a hazard to those working around any electrically powered apparatus.

To prevent the escape of particles over the side walls of the trough, the free ends 100 of the chute have toed in, spaced wall surfaces 130, 132. With the cylinder in the retracted position, wall 130 blocks material discharging from the chute to prevent the material from escaping outside of the side wall 66. In the cylinder extended position, the wall surface 132 serves the same function to prevent escape of material over the side wall 64.

The chute is automatically reciprocated continuously as the vibratory conveyor is driven by motor 48. Thus the material moves continuously towards the outlet end of the trough and is distributed in a serpentine path by the chute substantially along the width of the trough as the chute moves back and forth. This prevents localized accumulation of material as would occur with a stationary chute. It can be seen in FIG. 2 that the material is deposited on the trough in a serpentine path and is substantially uniform in depth. The material in the case of glass gobs is itself self-leveling to a certain extent by reason of the gobs exploding and spraying generally in all directions from the thermal shock upon the material encountering the cooling fluid.

Another aspect of the invention is the provision of structure to move the chute to a bypass position. The second section 126 of cylinder 114 is extensible relative to the bracket 117 for supporting the cylinder end. With the sections 125, 126 fully extended, the chute is rotated 90° clockwise from its normal or solid line position in FIG. 2 so that the chute discharges at a location away from the conveyor trough 26. A tap box 136 is provided to collect discharging material from the chute. An optional shield 137 guides material into the tap box.

To facilitate access to the tap box 136, it might be desirable, in light of restraints imposed by the surrounding environment, to have a second bypass position, wherein the chute is rotated still further clockwise from its position over the tap box 136 in FIG. 2. This can be accomplished by removing pin 124 from the fitting 120 and manually repositioning the chute 78. Automated movement of the chute 78 to the second bypass position can be accomplished by providing a third cylinder (not shown), also connected in tandem to the post 90. This additional feature adds to overall system flexibility.

A further aspect of the invention is the provision of a cooling jacket 138 built around a portion of the discharge chute 78, as shown in FIGS. 1 and 4. The cooling jacket has a wall 140 which, in conjunction with a surface 142 outside of the chute, defines a cooling flow path 144 for fluid. Fluid is introduced through an inlet pipe 146 at the bottom of the jacket 138 and into the flow path 144 and flows in heat exchange relationship with the walls 140, 142 upwardly towards the inlet portion 96 of the discharge chute 78 and through openings 147 into an annular header 148. The header 148 is mounted at the upper region of the chute and causes fluid flowing upwardly in the flow path 144 to be distributed through openings 149 over and flow downwardly against the inside surfaces 104 and 106 of the conduit to effect cooling thereof. The cooling fluid flows vertically downward from the header 148 to prevent "splash back" out of the top of the interface 150 of the stationary feed conduit 102 and the oscillating chute assembly.

A protective steel casing 152 covers the pneumatic cylinder 114 to shield the same from the high temperature glass gobs. A protective hood 158 and shroud 160, depending from the hood 158, likewise shield a portion of the cylinder 114 and the thrust bearing assembly 92.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A structure for controllably discharging heated articles that are being continuously transported by a primary conveying structure, said discharging structure comprising:
    a fluid retention reservoir with a bottom wall and an exposed supply of cooling fluid;
    vibratory means for conveying articles on the bottom wall through the fluid supply in a first direction,
    said retention reservoir having an inlet end and an outlet end spaced downstream of said inlet end;
    a discharge assembly having a chute with an inlet and an outlet;
    means for directing articles from the primary conveying structure into said discharge chute inlet;
    means on the discharge chute for directing articles from the chute inlet through the chute outlet into the fluid and against the bottom wall of the retention reservoir at the inlet end thereof for conveyance by the vibratory conveying means towards the outlet end of the retention reservoir;
    means for moving the discharge chute reciprocatively so that the chute outlet means moves in a path that is transverse to the first direction and articles discharging from the chute outlet can be distributed on the bottom wall of the retention reservoir to thereby prevent localized accumulation of articles; and
    means for cooling the discharge chute as the heated articles are being transported.

2. The structure for controllably discharging articles according to claim 1 wherein said fluid retention reservoir has spaced, upright side walls to contain the supply of cooling fluid in conjunction with the bottom wall, means resiliently mount the bottom wall at the inlet end of the retention reservoir in cantilever fashion to a rigid support so that the outlet end of the reservoir is unsupported and means are provided to transmit vibration from the vibratory means to said bottom wall of the retention reservoir.

3. The structure for controllably discharging articles according to claim 2 wherein means mount the chute for rotation about an axis, the moving means rotate the chute back and forth about said axis, and said discharge chute has a bottom wall and spaced side walls and said side walls extend downstream further than the bottom wall to confine articles moving off of the bottom wall of the discharge chute into the retention reservoir.

4. The structure for controllably discharging aticles according to claim 3 wherein the means for moving the discharge chute comprises a member with an extensible portion and means are provided for selectively extending and retracting said extensible portion.

5. A structure for controllably discharging heated articles that are being continuously transported by a primary conveying structure, said discharging structure comprising:
    a fluid retention reservoir with a bottom wall and an exposed supply of cooling fluid;
    vibratory means for conveying articles on the bottom wall through the fluid supply in a first direction,
    said retention reservoir having an inlet end and an outlet end spaced downstream of said inlet end;
    a discharge assembly having a chute with an inlet and an outlet;
    means for directing articles from the primary conveying structure into said discharge chute inlet;
    means on the discharge chute for directing articles from the chute inlet through the chute outlet into the fluid and against the bottom wall of the retention reservoir at the inlet end thereof for conveyance by the vibratory conveying means towards the outlet end of the retention reservoir; and
    means for moving the discharge chute reciprocatively so that the chute outlet moves in a path that is transverse to the first direction and articles discharging from the chute outlet can be distributed on the bottom wall of the retention reservoir to thereby prevent localized accumulation of articles.
    wherein said discharge chute has a bottom wall with a surface exposed to the articles, means are provided for cooling the discharge chute and said cooling means has means for distributing and directing a cooling fluid downwardly against the bottom wall surface of the discharge chute.

6. A structure for controllably discharging heated articles that are being continuously transported by a primary conveying structure, said discharging structure comprising:
    a fluid retention reservoir with a bottom wall and an exposed supply of cooling fluid;
    vibratory means for conveying articles on the bottom wall through the fluid supply in a first direction;
    said retention reservoir having an inlet and an outlet and spaced downstream of said inlet end;
    a discharge assembly having a chute with an inlet and an outlet;
    means for directing articles from the primary conveying structure into said discharge chute inlet;
    means on the discharge chute for directing articles from the chute inlet through the chute outlet into the fluid and against the bottom wall of the retention reservoir at the inlet end thereof for conveyance by the vibratory conveying means towards the outlet end of the retention reservoir; and
    means for moving the discharge chute reciprocatively so that the chute outlet moves in a path that is transverse to the first direction and articles discharging from the chute outlet can be distributed on the bottom wall of the retention reservoir to thereby prevent localized accumulation of articles.
    wherein a cooling jacket is provided around at least a portion of the discharge assembly to contain a cooling fluid, said discharge chute has a bottom wall with oppositely facing surfaces, articles are guided by one of the oppositely facing surfaces of the bottom wall of the discharge chute between the discharge chute inlet and outlet and said cooling jacket has means for delivering fluid upwardly in heat exchange relationship with the other of the oppositely facing surfaces and downwardly in heat exchange relationship against the one oppositely facing surface of the discharge chute bottom wall.

7. A structure for controllably discharging heated articles that are being continuously transported by a primary conveying structure, said discharging structure comprising:

a fluid retention reservoir containing a supply of cooling fluid and having a bottom wall to support said fluid supply and articles;

a secondary means for conveying articles in a first direction along said bottom wall through the fluid and having an entry end with a width transverse to the first direction;

a discharge assembly having a chute with an inlet and an outlet;

means for selectively directing articles being transported by the primary conveyor into the chute inlet;

means mounting the discharge assembly so that the chute is rotatable about an axis and the chute outlet is above the secondary conveying means at the entry thereof;

means for moving the discharge chute reciprocatively about said axis so that the chute outlet moves back and forth across the width of the secondary conveyor means at the entry end thereof to thereby distribute articles from the primary conveyor structure across the width of the secondary conveyor and thereby prevent localized accumulation of articles; and means for cooling the discharge chute as the heated articles are being transported.

8. The structure for controllably discharging articles according to claim 7 wherein said chute inlet is above said chute outlet and articles move by gravity between the chute inlet and outlet.

9. The structure for controllably discharging articles according to claim 7 wherein said discharge chute has an inclined surface for intercepting articles introduced at the chute inlet and directing articles towards the chute outlet.

10. A structure for controllably discharging heated articles that are being continuously transported by a primary conveying structure comprising:

a fluid retention reservoir containing a supply of cooling fluid and having a bottom wall to support said liquid supply and articles;

a secondary means for conveying articles in a first direction along said bottom wall through the fluid and having an entry end with a width transverse to the first direction;

a discharge assembly having a chute with an inlet and an outlet;

means for selectively directing articles being transported by the primary conveyor into the chute inlet;

means mounting the discharge assembly so that the chute is rotatable about an axis and the chute outlet is above the secondary conveying means at the entry end thereof; and means for moving the discharge chute reciprocatively about said axis so that the chute outlet moves back and forth across the width of the secondary conveyor means at the entry end thereof to thereby distribute articles from the primary conveyor structure across the width of the secondary conveyor and thereby prevent localized accumulation of articles, whereby a cooling jacket surrounds at least a portion of said discharge assembly and means are provided on the cooling jacket to deliver a supply of cooling fluid downwardly against the discharge chute and into the fluid retention reservoir.

11. A structure for controllably discharging heated articles that are being continuously transported by a primary conveying structure comprising:

a fluid retention reservoir containing a supply of cooling fluid and having a bottom wall to support said liquid supply and articles;

a secondary means for conveying articles in a first direction along said bottom wall through the fluid and having an entry end with a width transverse to the first direction;

a discharge assembly having a chute with an inlet and an outlet;

means for selectively directing articles being transported by the primary conveyor into the chute inlet;

means mounting the discharge assembly so that the chute is rotatable about an axis and the chute outlet is above the secondary conveying means at the entry end thereof; and means for moving the discharge chute reciprocatively about said axis so that the chute outlet moves back and forth across the width of the secondary conveyor means at the entry end thereof to thereby distribute articles from the primary conveyor structure across the width of the secondary conveyor and thereby prevent localized accumulation of articles, wherein cooling means are provided to continuously deliver a cooling fluid against at least a portion of the chute assembly in heat exchange relationship.

12. The structure for controllably discharging articles according to claim 11 wherein said discharge chute has an outside surface and an article guiding surface, the cooling means has an inlet and means for guiding fluid from the inlet for the cooling means both against the article guiding surface and the outside surface of the chute.

* * * * *